US010264524B2

(12) United States Patent
Hirai et al.

(10) Patent No.: US 10,264,524 B2
(45) Date of Patent: Apr. 16, 2019

(54) WIRELESS COMMUNICATION SYSTEM, AND WIRELESS COMMUNICATION METHOD IN WIRELESS COMMUNICATION SYSTEM (71) Applicant: PANASONIC INTELLECTUAL PROPERTY MANAGEMENT CO., LTD., Osaka (JP)

(72) Inventors: Katsuhiro Hirai, Fukuoka (JP); Toshiyuki Sugitani, Saga (JP); Shinji Fukuda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 14/850,276

(22) Filed: Sep. 10, 2015

(65) Prior Publication Data
US 2016/0088552 A1   Mar. 24, 2016

(30) Foreign Application Priority Data

Sep. 19, 2014   (JP) ................................. 2014-190992

(51) Int. Cl.
*H04M 11/02* (2006.01)
*H04W 52/02* (2009.01)
*H04W 84/20* (2009.01)

(52) U.S. Cl.
CPC ..... *H04W 52/0203* (2013.01); *H04M 11/025* (2013.01); *H04W 52/0212* (2013.01);
(Continued)

(58) Field of Classification Search
CPC ......... H04W 52/0203; H04W 52/0212; H04W 52/0235; H04W 52/0241; H04M 11/002;
(Continued)

(56) References Cited

U.S. PATENT DOCUMENTS

2004/0087323 A1* 5/2004 Nitta ................... H04W 76/043
455/462
2006/0082454 A1* 4/2006 Fukuda ................. H04N 7/186
340/531
(Continued)

FOREIGN PATENT DOCUMENTS

JP   2003-087180   3/2003
JP   2011-117150   6/2011
(Continued)

OTHER PUBLICATIONS

U.S. Appl. No. 14/854,107 to Katsuhiro Hirai et al., filed Sep. 15, 2015.
(Continued)

*Primary Examiner* — Marsha D Banks Harold
*Assistant Examiner* — Dharmesh J Patel
(74) *Attorney, Agent, or Firm* — Greenblum & Bernstein, P.L.C.

(57) ABSTRACT

In a wireless communication system including a slave device, and a master device wirelessly connected to the slave device, the slave device includes a wireless communicator that performs wireless communication with the master device, a power supply unit that supplies power to each unit of the slave device, an interrupt detector that detects various interrupts, and a controller that controls the entire slave device, the interrupt detector supplies the power from the power supply unit to each unit of the slave device when detecting a timer interrupt occurring at predetermined intervals, and the controller performs control to perform an initialization process of the wireless communicator when the power is supplied from the power supply unit to each unit of the slave device, and perform an entire initialization process of the slave device when a capture signal is received via the wireless communicator.

5 Claims, 6 Drawing Sheets (52) U.S. Cl.
CPC ........ *H04W 52/0235* (2013.01); *H04W 84/20* (2013.01); *Y02D 70/00* (2018.01); *Y02D 70/142* (2018.01); *Y02D 70/162* (2018.01)

(58) Field of Classification Search
CPC .... H04M 11/007; H04M 11/025; H04N 7/186
See application file for complete search history.

(56) References Cited

U.S. PATENT DOCUMENTS

| | | | |
|---|---|---|---|
| 2012/0243559 A1* | 9/2012 | Pan | H04J 3/1605 370/503 |
| 2013/0322316 A1 | 12/2013 | Hara et al. | |
| 2014/0104038 A1 | 4/2014 | Hokazono et al. | |

FOREIGN PATENT DOCUMENTS

| | | | | |
|---|---|---|---|---|
| JP | 2014-082615 | 5/2014 | | |
| WO | 2006/045601 | 5/2006 | | |
| WO | 2008/064270 | 5/2008 | | |
| WO | WO 2008064270 A2 * | 5/2008 | ............ | H04N 7/185 |
| WO | 2013/065875 | 5/2013 | | |

OTHER PUBLICATIONS

U.S. Appl. No. 14/850,135 to Katsuhiro Hirai et al., filed Sep. 10, 2015.
The Extended European Search Report dated Jan. 11, 2016 for the related European Patent Application No. 15184419.8.

* cited by examiner

WIRELESS COMMUNICATION SYSTEM, AND WIRELESS COMMUNICATION METHOD IN WIRELESS COMMUNICATION SYSTEM

BACKGROUND OF THE INVENTION

1. Field of the Invention

The present invention relates to a wireless communication system, and a wireless communication method in the wireless communication system.

2. Description of the Related Art

Awareness of crime prevention has improved year by year. In recent years, a demand for the realization of entrance monitors or the like through simple installation at a low cost even in single occupant households such as detached houses as well as studio apartments is increasing.

According to such a demand for the simple installation at a low cost, an entrance monitor in which a slave device of the entrance monitor or a master device of the entrance monitor is driven by a battery, and both of the devices are caused to perform wireless communication, making wiring work unnecessary, has begun to spread. In this case, since work for battery replacement occurs when the battery lifetime of the battery mounted on the slave device or the monitor master device expires, there is a need for a wireless communication system for reducing power consumption.

As a method of implementing reduction of power consumption of such a wireless communication system, a wireless communication technology in which a called station repeats regular reception, and a calling station continuously transmits a capture signal longer than an interval of the regular reception of the called station to transition to a constant operation, disclosed in, for example, Japanese Patent Unexamined Publication No. 2003-087180, is known.

Further, technology of a wireless master device (calling device) for suppressing useless continuous transmission when a call signal is continuously transmitted to an intermittently receiving wireless slave device (locator) so as to establish synchronization of transmission and reception, disclosed in, for example, Japanese Patent Unexamined Publication No 2014-082615, is known.

However, although the technology disclosed in Japanese Patent Unexamined Publication No. JP 2003-087180 can achieve a certain object of reducing power consumption of the called station (slave device), reduction of power consumption on the master side has not been considered. Further, the technology disclosed in Japanese Patent Unexamined Publication No. 2014-082615 is intended to reduce the power consumption for a transmission operation on the master side, in addition to reduction of the power consumption of the wireless slave device (locator), but reduction of power consumption of operations, including a reception operation, has not been considered.

SUMMARY OF THE INVENTION

The present invention has been made to solve the aforementioned problems of the related art, and a main object thereof is to provide a wireless communication system capable of greatly reducing power consumption of a wireless slave device and a wireless master device to satisfy the demand for simple installation at a low cost.

A wireless communication system of the present invention is a wireless communication system including a slave device, and a master device wirelessly connected to the slave device, in which the slave device includes: a slave device wireless communicator that performs wireless communication with the master device; a slave device power supply unit that supplies power to each unit of the slave device; a slave device interrupt detector that detects various interrupts; and a slave device controller that controls the entire slave device, the slave device interrupt detector supplies the power from the slave device power supply unit to each unit of the slave device when detecting a timer interrupt occurring at predetermined intervals, and the slave device controller performs control to perform an initialization process of the slave device wireless communicator when the power is supplied from the slave device power supply unit to each unit of the slave device, and perform an entire initialization process of the slave device when a capture signal is received via the slave device wireless communicator.

According to the present invention, it is possible to provide a wireless communication system capable of greatly reducing power consumption of a wireless slave device through the configuration described above.

DETAILED DESCRIPTION OF THE PREFERRED EMBODIMENT

Hereinafter, embodiments of the present invention will be described with reference to the drawings.

First Exemplary Embodiment

Figure 1:
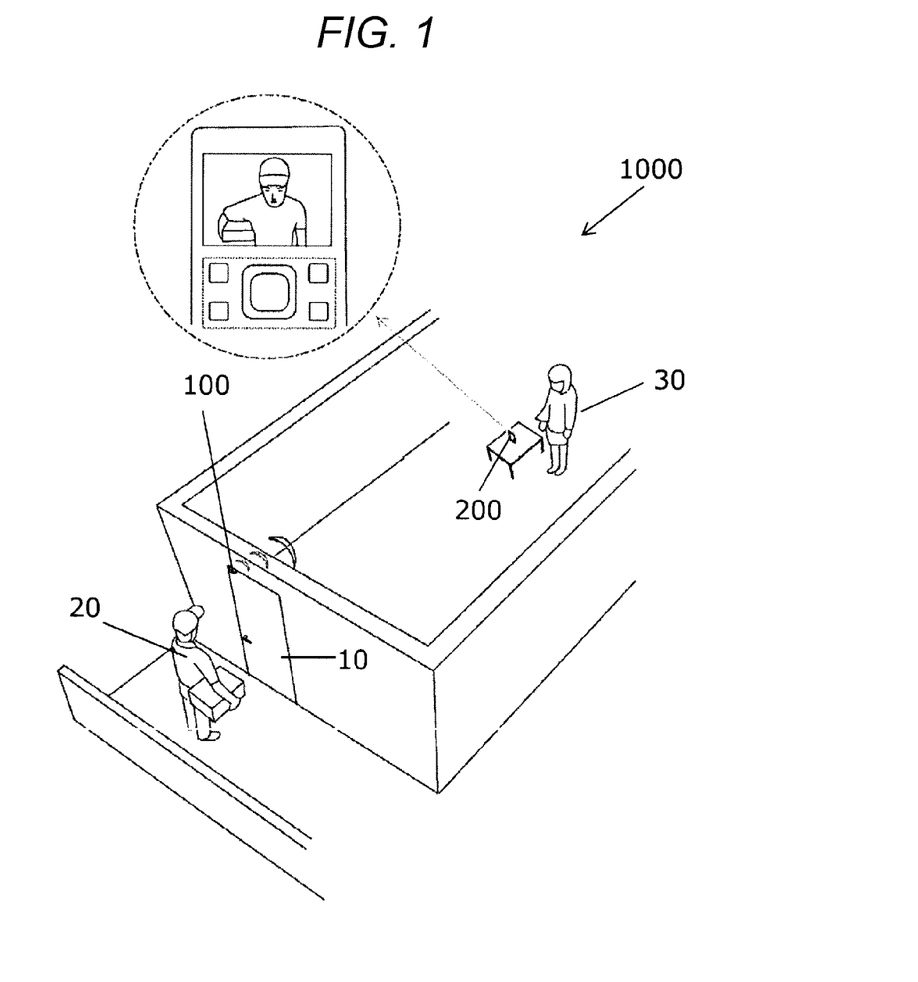
FIG. 1 is a schematic diagram illustrating an overview of a wireless communication system in a first exemplary embodiment.

FIG. 1 is a schematic view illustrating an overview of wireless communication system 1000 according to a first exemplary embodiment. Wireless communication system 1000 includes camera device 100, and monitor device 200. Camera device 100 and monitor device 200 communicate with each other via a wireless line.

Camera device 100 is arranged on the external (outdoor) side relative to entrance door 10 near entrance door 10 of a house, and installed to be hooked to an upper portion of entrance door 10. Camera device 100 images an outdoor space (for example, visitor 20, and the outdoor vicinity of entrance door 10).

Monitor device 200 is installed on the residential space (indoor) side relative to entrance door 10, and displays an image received from camera device 100 at a predetermined timing. The predetermined timing is, for example, a timing at which resident 30 hearing a chime sound or a knocking sound at entrance door 10 generated by visitor 20 operates monitor device 200 to confirm visitor 20.

Display by monitor device 200 is confirmed by resident 30. Monitor device 200 may be fixed in a predetermined indoor position (for example, an indoor wall) or may be suitably held and moved by indoor resident 30. FIG. 1 illustrates a case in which monitor device 200 is placed on an indoor table.

Figure 2:
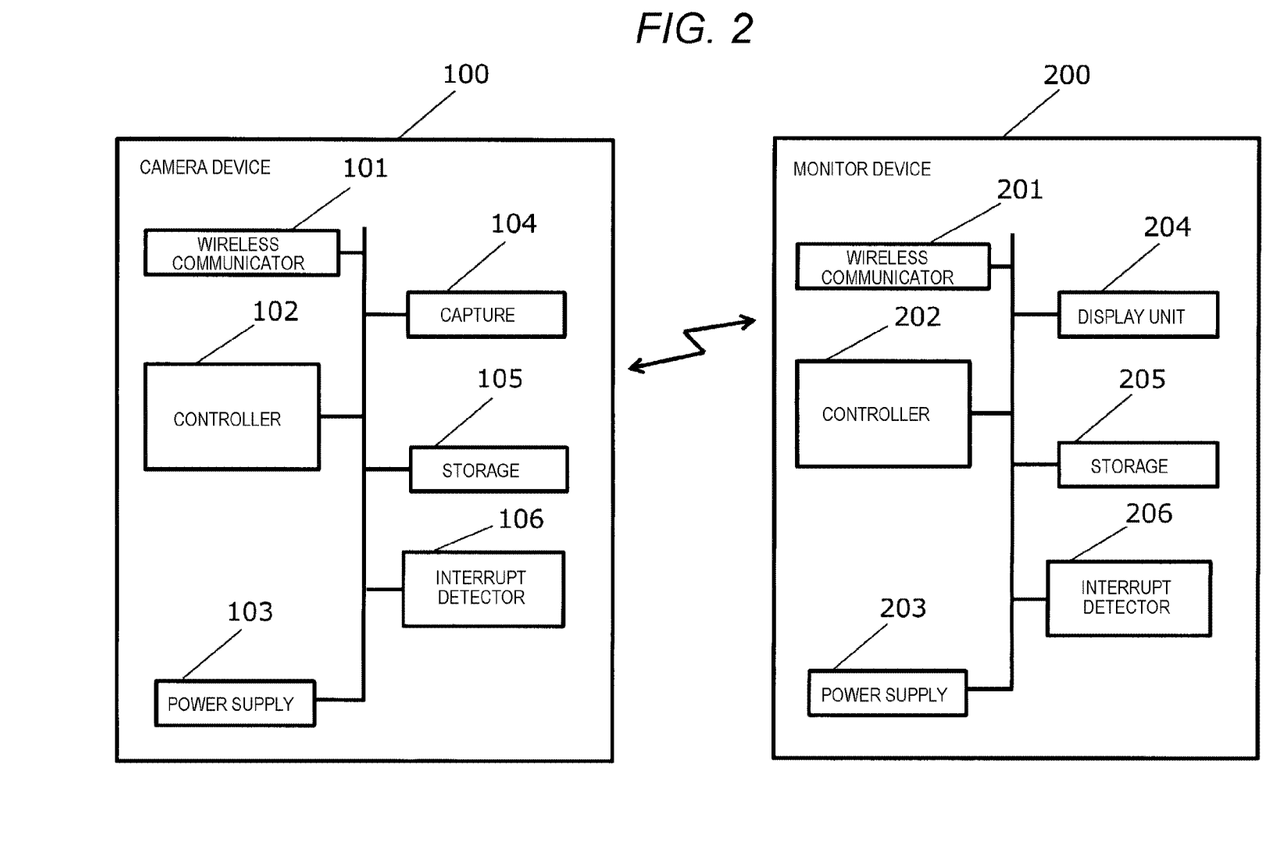
FIG. 2 is a block diagram illustrating an example of a configuration of the wireless communication system in the first exemplary embodiment.

FIG. 2 is a block diagram illustrating an example of a configuration of wireless communication system 1000 according to the first exemplary embodiment.

Configuration of the Camera Device

Camera device 100 includes wireless communicator 101, controller 102, power supply 103, capture 104, storage 105, and interrupt detector 106.

Wireless communicator 101 communicates with monitor device 200 over a wireless line. A communication scheme in wireless communicator 101 includes, for example, digital enhanced cordless telecommunication (DECT), a wireless local area network (LAN), or Zigbee (registered trademark).

Wireless communicator 101 transmits a captured image to monitor device 200. Accordingly, indoor resident 30 can visually recognize visitor 20 present in the vicinity of entrance door 10. Further, wireless communicator 101 receives voice of visitor 20 using a microphone (not illustrated) of camera device 100, and transmits audio information including the voice of visitor 20 to monitor device 200. Further, wireless communicator 101 receives audio information including voice of resident 30 from monitor device 200. Accordingly, outdoor visitor 20 and indoor resident 30 can talk to each other.

Controller 102 includes, for example, a read only memory (ROM), a random access memory (RAM), and a central processing unit (CPU). For example, the CPU executes a program held in the ROM to realize various functions of controller 102.

Controller 102 performs various controls, operations, and determinations for entire camera device 100. Controller 102 performs an operation process for controlling each unit of camera device 100.

Power supply 103 supplies power to each unit in order to operate camera device 100. In power supply 103, power may be input from an AC power supply or an AC adapter. Power supply 103 may include a battery such as a primary battery or a secondary battery in consideration of installation.

Capture unit 104 images a predetermined outdoor space. An image captured by capture 104 (captured image) includes, for example, a moving image and a still image, and visitor 20, a passerby, a suspicious person, an object other than a human, and the like are included in the captured image.

Storage unit 105 includes a flash memory or the like, and stores, for example, device information, such as an identification number, and setup information of camera device 100, state information of monitor device 200, and a captured image before transmission to monitor device 200.

Interrupt detector 106 detects key interrupt of a button or the like included in camera device 100, interrupt by a timer, and interrupt by various events. The detection of the interrupt includes detection by hardware and detection by software.

Interrupt detector 106 also has a function of controlling supply of power from power supply 103 to each unit in order to realize ultra-low power consumption. For example, on the circuit, interrupt detector 106 is located between power supply 103 and each unit such as controller 102, and only interrupt detector 106 is operated at all times by the low power of power supply 103. Interrupt detector 106 turns the switching element ON/OFF in order to supply power to each unit based on the detection of a predetermined interrupt.

Configuration of the Monitor Device

Monitor device 200 includes wireless communicator 201, controller 202, power supply 203, display unit 204, storage 205, and interrupt detector 206.

Wireless communicator 201 communicates with camera device 100 via a wireless line. A communication scheme in wireless communicator 201 includes, for example, DECT, a wireless LAN, or Zigbee (registered trademark).

Wireless communicator 201 receives the captured image from camera device 100. Accordingly, indoor resident 30 can visually recognize visitor 20 present in the vicinity of entrance door 10. Further, wireless communicator 201 receives the audio information including voice of visitor 20 from camera device 100. Further, wireless communicator 201 receives the voice of resident 30 using a microphone (not illustrated) of monitor device 200, and transmits the audio information including the voice of resident 30 to camera device 100. Accordingly, outdoor visitor 20 and indoor resident 30 can talk to each other.

Controller 202 includes, for example, ROM, RAM, and a CPU. For example, the CPU executes a program held in the ROM to realize various functions of controller 202.

Controller 202 performs various controls, operations, and determinations for entire monitor device 200. Controller 202 performs an operation process for controlling each unit of monitor device 200.

Power supply 203 supplies power to each unit in order to operate monitor device 200. In power supply 203, power may be input from an AC power supply or an AC adapter. Power supply 203 may include a battery such as a primary battery or a secondary battery in consideration of installation.

The display unit 204 includes, for example, a liquid crystal display (LCD), and displays various images. The image includes, for example, a moving image and a still image, and includes the captured image from camera device 100, and an image for operating monitor device 200.

Storage unit 205 includes a flash memory or the like, and stores various images, voices, or other management information. The image includes, for example, a moving image, and a still image, and includes a captured image from camera device 100, and an image for operating monitor device 200. The voice includes, for example, voice of a fixed message generated from monitor device 200.

The other management information includes, for example, password information for preventing various setup information of monitor device 200 from being forcibly changed.

Interrupt detector 206 detects key interrupt of a button or the like included in monitor device 200, interrupt by a timer, and interrupt by various events. The detection of the interrupt includes detection by hardware and detection by software.

Interrupt detector 206 also has a function of controlling supply of power from power supply 203 to each unit in order to realize ultra-low power consumption. For example, on the circuit, interrupt detector 206 is located between power supply 203 and each unit such as controller 202, and only interrupt detector 206 is operated at all times by low power of power supply 203. Interrupt detector 206 turns the switching element ON/OFF in order to supply power to each unit based on the detection of a predetermined interrupt.

Figure 3:
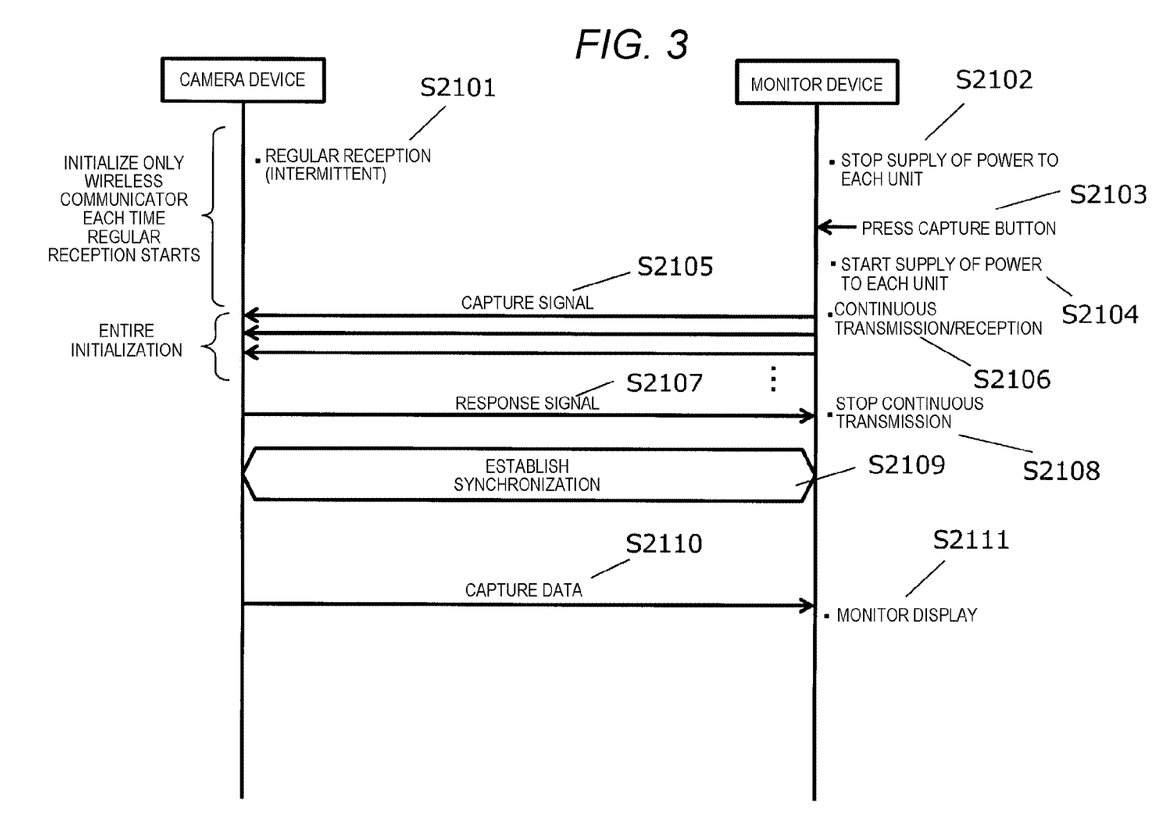
FIG. 3 is a sequence diagram illustrating an overview of an operation of the wireless communication system in the first exemplary embodiment.

FIG. 3 is a sequence diagram illustrating an overview of an operation of wireless communication system 1000 in a first exemplary embodiment. An operation in an example of realization of ultra-low power consumption and a request for a captured image according to this sequence will be described with appropriate reference to FIG. 2.

Realization of Ultra-Low Power Consumption

In wireless communication system 1000 of this exemplary embodiment, first, a characteristic point is that camera device 100 and monitor device 200 stop the supply of power from power supply unit 103 and power supply unit 203 to the respective units for a predetermined period of time.

A further characteristic point is that, at the time of supply of power from power supply unit 103 to each unit, which is performed by camera device 100 each time a predetermined period of time elapses, an initialization process of all of the respective units to which the power has been supplied is not performed, and only wireless communicator 101 is initialized.

Camera device 100 performs regular reception (intermittent reception) (S2101). For example, interrupt detector 106 described with reference to FIG. 2 turns ON the switching element for supply of power from power supply unit 103 to each unit when the interrupt has occurred due to the timer at predetermined intervals (for example, 2.56 seconds).

When the power is supplied to each unit of camera device 100, controller 102 performs the initialization process of wireless communicator 101. The initialization process of wireless communicator 101 is, for example, a process of setting parameters used when wireless communicator 101 performs the wireless communication, or starting up a program module for each layer of wireless communicator 101. In this case, controller 102 does not perform an initialization process of units not related to a process at the time of regular reception to be described below.

When the initialization process of wireless communicator 101 by controller 102 is completed, wireless communicator 101 performs a reception operation, and accordingly, camera device 100 performs the regular reception.

On the other hand, monitor device 200 stops the supply of power from power supply unit 203 to each unit even while camera device 100 is performing the regular reception (S2102). In monitor device 200, the switching element that supplies the power from power supply unit 203 to each unit as illustrated in FIG. 2, for example, is turned OFF.

Sequence in Example of Request for Captured Image

In monitor device 200, when a capture button (not illustrated) is pressed (S2103), supply of power from power supply unit 203 to each unit is started (S2104). For example, interrupt detector 206 described with reference to FIG. 2 detects the key interrupt caused by pressing of the capture button, and turns ON the switching element for supply of power from power supply unit 203 to each unit.

Wireless communicator 201 to which the power has been supplied transmits a capture signal for performing a synchronization process with camera device 100 (S2105). In this case, wireless communicator 201 continuously transmits the capture signal at predetermined intervals (for example, 2.56 seconds) of the regular reception of camera device 100, and performs reception of the response signal (S2106). In addition, details of the operation of the continuous transmission and reception will be described below.

In camera device 100, when wireless communicator 101 receives the capture signal through the regular reception, controller 102 performs an initialization process of each unit of camera device 100 on which the initialization process has not yet been performed. For example, in this step, resetting of a logic circuit on which the initialization process has not yet been performed, clearing of various memories, clearing of a counter, a validity check of various programs, or the like is performed.

Wireless communicator 101 transmits a response signal to monitor device 200 as a response to the received capture signal (S2107). Then, wireless communicator 101 starts the synchronization process based on synchronization information included in the capture signal under the control of controller 102.

On the other hand, when wireless communicator 201 receives the response signal from camera device 100, monitor device 200 stops the continuous transmission of the capture signal (S2108), and starts a synchronization process.

When synchronization is established between camera device 100 and monitor device 200 (S2109), camera device 100 transmits capture data (captured image) captured by capture 104 to monitor device 200 using wireless communicator 101 (S2110).

In this case, the capture data that camera device 100 transmits to monitor device 200 may be capture data captured by capture 104 in response to the reception of the capture signal, or capture data read from storage 105 that stores the capture data that has been captured in advance.

For example, if interrupt detector 106 supplies power to each unit even when interrupt detector 106 detects an interrupt from the human sensor or the like, imaging by capture 104 and storage of the capture data in storage 105 become possible when the sensor reacts. Accordingly, it is possible to image a suspicious person or the like while performing a power saving operation.

When wireless communicator 201 receives the image data from camera device 100, monitor device 200 displays the images sent as image data on display unit 204 (S2111).

Operation of Initialization

Figure 4:
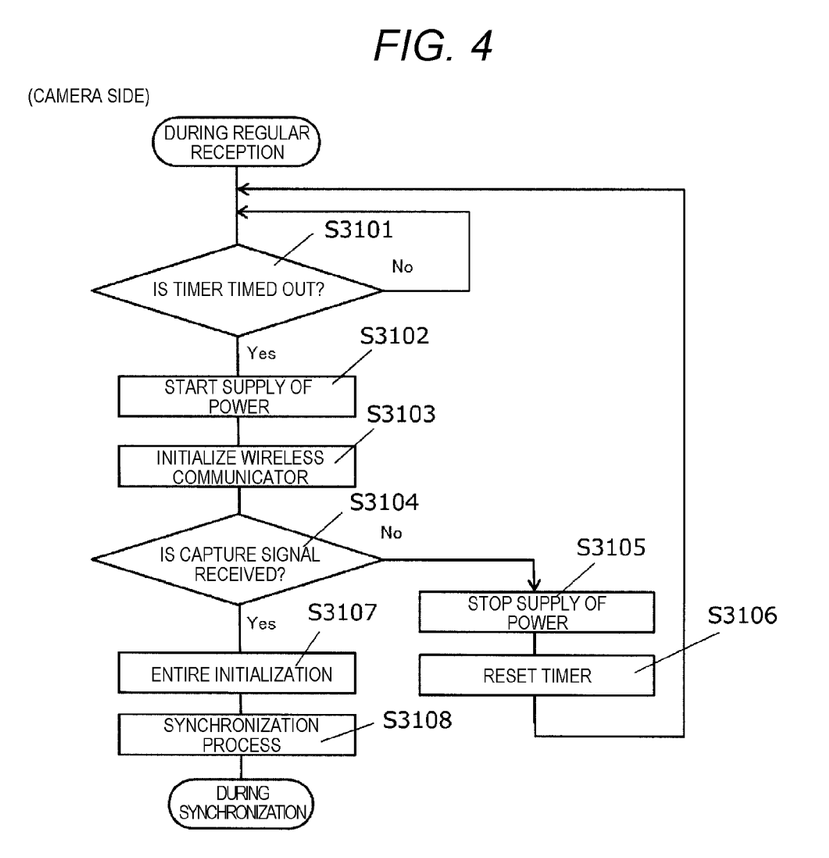
FIG. 4 is a flowchart illustrating an initialization operation of camera device 100 in the first exemplary embodiment.

FIG. 4 is a flowchart illustrating an initialization operation of camera device 100 in the first exemplary embodiment. Operations of the initialization of wireless communicator 101 described in step S2101 and the entire initialization described in step S2107 of FIG. 3 will be described according to this flowchart.

In FIG. 4, interrupt detector 106 of camera device 100 determines whether a timer for performing the regular reception is timed out based on the presence or absence of the interrupt by the timer (S3101). When the timer is not timed out (S3101: No), interrupt detector 106 returns to step S3101 and waits for the timer to time out (hereinafter, referred to as a "sleep period").

When the timer is timed out (S3101: Yes), interrupt detector 106 performs supply of power from power supply unit 103 to each unit (S3102), and controller 102 performs initialization of wireless communicator 101 (S3103). The initialization is performed, for example, in the following procedure. First, controller 102 to which the power has been supplied selects an initialization program necessary for initialization of wireless communicator 101 from among initialization programs stored in the ROM, and loads the initialization program to the RAM. Then, the selected initialization program starts up.

The initializing program loads a parameter used when wireless communicator 101 performs the wireless communication or a program module necessary for the wireless communication from the ROM to the RAM, and starts up the program module. Accordingly, wireless communicator 101 becomes capable of receiving signals from monitor device 200.

Controller 102 determines whether the capture signal described in step S2105 has been received using wireless communicator 101 (S3104). When the capture signal is not received (S3104: No), the supply of power from power supply unit 103 to each unit is stopped by interrupt detector 106 (S3105). Interrupt detector 106 resets the timer for performing regular reception (S3106), returns to step S3101, and enters the sleep period to wait for the timer to be timed out.

On the other hand, when the capture signal is received (S3104: Yes), controller 102 performs entire initialization of camera device 100 (S3107). The entire initialization is performed, for example, in the following procedure. First, controller 102 selects an initialization program necessary for entire initialization of camera device 100 from among initialization programs stored in the ROM, and loads the initialization program to the RAM. Then, the selected entire initialization program starts up.

The entire initializing program loads a parameter used by each unit or a necessary program module from the ROM to the RAM, and starts up the program module.

An entire initialization program performs resetting of a logic circuit, clearing of various memories, clearing of a counter, validity check of various programs, or the like, and similarly performs initialization around a CPU such as a serial I/O controller. Further, for example, in the initialization process of capture 104, an imaging program module that has started up loads parameters or the like used when capture 104 performs imaging from storage 105 to the RAM. Thus, all functions of camera device 100 are available.

Camera device 100 that has completed the entire initialization transmits the response signal described in step S2107 to monitor device 200, performs a synchronization process (S3108), performs the synchronization establishment described in step S2109, and transitions to during the synchronization.

Power Consumption Associated with Initialization Process and Power Consumption Associated with Entire Initialization Power consumption associated with initialization process and power consumption associated with entire initialization at the time of regular reception will be described. First, description will be given while showing the transmission and reception timings of signals between monitor device 200 and camera device 100 according to the sequence described with reference to FIG. 3, and subsequently, power consumption (current consumption) associated with the initialization/entire initialization process at a capture signal reception timing from a timing of the regular reception will be described.

Signal Transmission and Reception Timing

Figure 5:
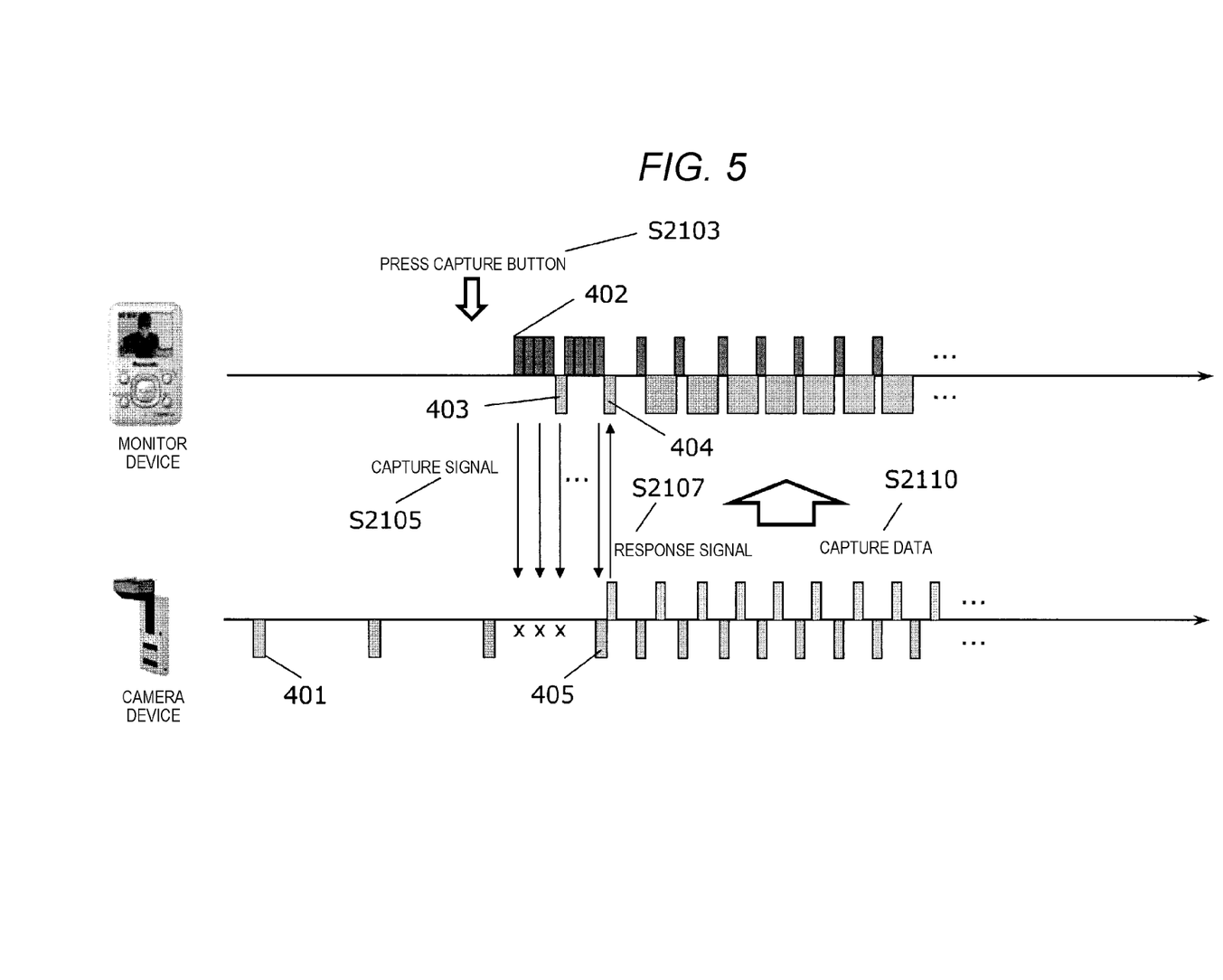
FIG. 5 is a diagram illustrating signal transmission and reception between camera device 100 and monitor device 200 when a capture button is pressed in the first exemplary embodiment.

FIG. 5 is a diagram illustrating signal transmission and reception between camera device 100 and monitor device 200 when the capture button is pressed in the first exemplary embodiment. As illustrated in FIG. 5, when camera device 100 performs the regular reception described in step S2101, reception period 401 of a predetermined time S (for example, 0.8 milliseconds) is set at predetermined time intervals T (for example, 2.56 seconds).

When the capture button described in step S2103 is pressed, monitor device 200 transmits the capture signal described in step S2105 in a period continuous from a transmission period 402. A mark x of an arrival destination of the capture signal on camera device 100 side in FIG. 5 indicates that the capture signal cannot be received at timings of the regular reception at predetermined time intervals T after reception period 401 of camera device 100.

Monitor device 200 sets a period in which monitor device 200 continuously transmits the capture signal to be equal to the time interval T of the regular reception described above, or sets the period to be longer than the time interval T so that the capture signal is reliably received by camera device 100. However, when the period in which monitor device 200 continuously transmits the capture signal is long, power consumption increases. Accordingly, for example, several reception periods 403 and 404 are provided in the continuous transmission.

For example, monitor device 200 stops the continuous transmission if monitor device 200 can receive the response signal described in step S2107 in reception period 403, and continues the continuous transmission if monitor device 200 cannot receive the response signal, and performs the same determination in the next reception period 404. FIG. 5 illustrates an example in which the capture signal is received in reception period 405 of the regular reception of camera device 100, and the response signal transmitted in a subsequent transmission period 406 is received in reception period 404 described above.

Thus, in monitor device 200, by providing several reception periods within the continuous transmission of the capture signal, useless continuous transmission after a timing at which monitor device 200 can receive the response signal is suppressed and power saving is achieved.

Then, as described with reference to FIG. 3, synchronization is established between camera device 100 and monitor device 200, and the capture data described in step S2110 is transmitted from camera device 100 to monitor device 200 at a synchronized timing of transmission and reception.

Figure 6A:
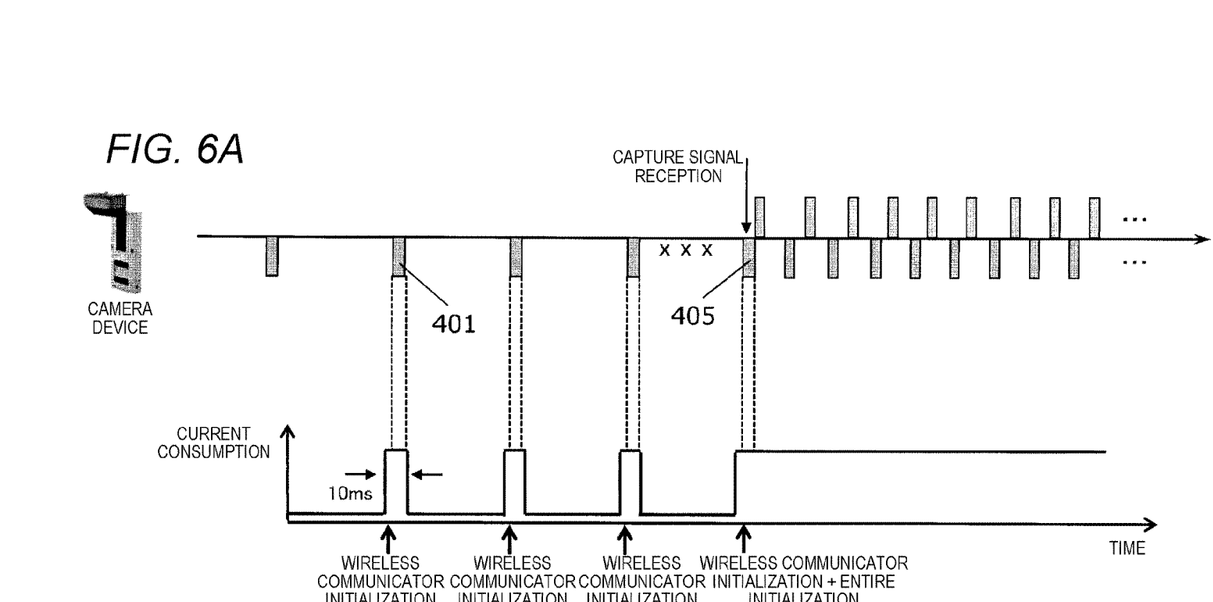
FIGS. 6A and 6B are diagrams illustrating current consumption due to a difference in an initialization process at the time of signal reception of the camera device in the first exemplary embodiment.
Figure 6B:
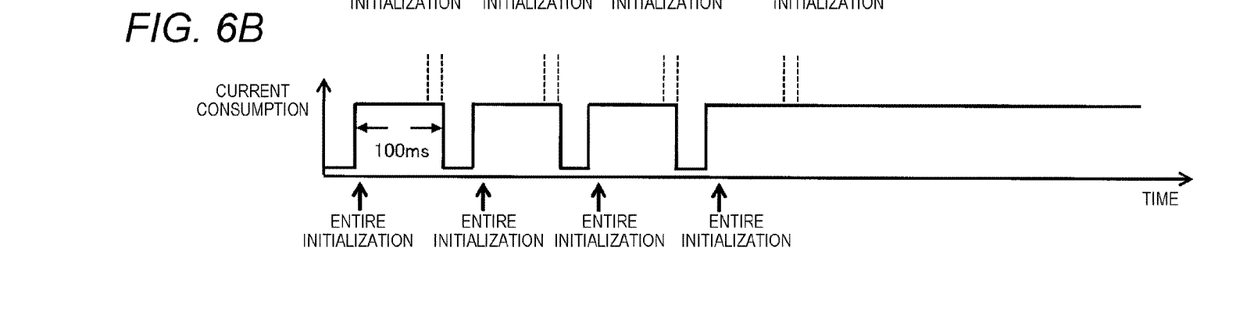

Power Consumption (Current Consumption) Associated with the Process of Initializing/Entire Initialization FIG. 6 is a diagram illustrating current consumption due to a difference in an initialization process at the time of signal reception of the camera device in the first exemplary embodiment. Signal transmission and reception timings of camera device 100 shown in an upper part are the signal transmission and reception timings of camera device 100 described with reference to FIG. 5.

In FIG. 6, reception period 401 of the reception and reception period 405 in which the capture signal has been received are denoted with the same reference numerals so that it is seen that the periods are the same timings as reception period 401 and reception period 405 of FIG. 5.

Further, (a) shown in a middle illustrates the current consumption of camera device 100 when only the initialization of wireless communicator 101 is performed during the regular reception described above, over time of transmission and reception timings of signals. Further, (b) shown in a lower part illustrates consumption of camera device 100 during conventional regular reception, for comparison.

In camera device 100, during a period from certain regular reception to the next regular reception, that is, during the sleep period, only interrupt detector 106 is operated by a weak current, such as a current on the order of a few microamperes or lower. On the other hand, in the reception period, interrupt detector 106 is operated by a current on the order of tens of milliamperes for an initialization process.

In the case of (a) of FIG. 6, in reception period 401, for example, time in which a current for an initialization process flows is 10 milliseconds that is time for only initialization of wireless communicator 101. The same applies to subsequent reception periods, and when the capture signal is received in reception period 405, current for initializing each other unit for the first time is consumed.

On the other hand, in the case of (b) of FIG. 6, the time in which a current for an initialization process flows in the reception period is 100 milliseconds that is an initialization time of entire camera device 100. Consumption of this current is continued during the reception period of the regular reception.

As described above, camera device 100 and monitor device 200 stop the supply of power from power supply unit 103 and power supply unit 203 to the respective units for a predetermined period of time. Moreover, since the supply of power to each unit is performed in response to the interrupt by interrupt detector 106 and interrupt detector 206, ultra-low power consumption can be realized.

Further, when camera device 100 performs the regular reception, an initialization process execution time of camera device 100 can be reduced. Thus, it is possible to greatly reduce power consumption of camera device 100, and to realize ultra-low power consumption.

Further, when camera device 100 performs the regular reception, camera device 100 is able to reliably receive the capture signal from monitor device 200, and accordingly, it is possible to provide wireless communication system 1000 capable of greatly reducing power consumption of camera device 100.

Second Exemplary Embodiment

In the second exemplary embodiment, an operation when interrupt detector 106 detects another interrupt during regular reception of camera device 100 shown in the first exemplary embodiment will be described.

In wireless communication system 1000 of this exemplary embodiment, a characteristic point is that, even when interrupt detector 106 has detected another interrupt other than the interrupt regarding regular reception (intermittent reception), all initialization processes of the respective units to which the power has been supplied are not performed, and only a unit related to the other detected interrupt is initialized.

When interrupt detector 106 detects another interrupt, such as an interrupt from a human sensor (not illustrated) or the like, camera device 100 performs supply of power to each unit if the supply of power from power supply unit 103 to each unit is stopping.

Controller 102 determines an interrupt cause detected by interrupt detector 106 and determines whether camera device 100 is during the regular reception. When the interrupt is the interrupt from the human sensor, controller 102 performs the initialization process of only units necessary for an imaging process of capture 104 or the like. In this case, during the regular reception, and in the sleep period, transmission of the capture data is not immediately performed, and accordingly, the initialization process of wireless communicator 101 or the like is not performed. Further, in the reception period, since the initialization process of wireless communicator 101 has ended, a re-initialization process of wireless communicator 101 is not performed.

Further, in camera device 100, when wireless communicator 101 receives the capture signal through regular reception, controller 102 performs the initialization process of each unit of camera device 100 on which the initialization process has not yet been performed. In this case, for example, when the interrupt from the human sensor described above is received and an initialization process of units necessary for an imaging process of capture 104 or the like is performed, a re-initialization process is not performed.

As described above, even in cases other than the case in which camera device 100 performs the regular reception, the initialization process execution time of camera device 100 can be reduced. Thus, it is possible to greatly reduce power consumption of camera device 100, and to realize ultra-low power consumption.

Further, since camera device 100 determines an interrupt cause and performs only a necessary initialization process, it is possible to reduce a total initialization process execution time of camera device 100, to greatly reduce power consumption of camera device 100, and to realize ultra-low power consumption.

Moreover, since camera device 100 determines whether camera device 100 is during the regular reception and performs only a necessary initialization process, it is possible to reduce a total initialization process execution time of camera device 100, to greatly reduce power consumption of camera device 100, and to realize ultra-low power consumption.

While wireless communication system 1000 including camera device 100 and monitor device 200 has been described in the first and second exemplary embodiments, the present invention is not limited thereto, and is also effective in a radio wave remote control, a keyless entry system, or home safety related wireless communication system.

The present invention is useful in a wireless communication system capable of greatly reducing power consumption of a wireless slave device and a wireless master device.

What is claimed is:

1. A wireless communication system, comprising: a slave device; and a master device wirelessly connected to the slave device, wherein the slave device includes a slave device wireless communicator that performs wireless communication with the master device; a slave device power supply that includes a unit that supplies power to each unit of the slave device; a slave device interrupt detector that detects various interrupts; and a slave device controller that controls the entire slave device, the slave device interrupt detector supplies power from the slave device power supply to each unit of the slave device when detecting a timer interrupt occurring at predetermined intervals, and the slave device controller performs an initialization process of the slave device wireless communicator, and does not perform an entire initialization process of each unit of the slave device, when the power is supplied from the slave device power supply to each unit of the slave device, and (1) performs the entire initialization process of the slave device, when a capture signal is received that the slave device wireless communicator has been initialized, and (2) does not perform the entire initialization process of the slave device, stops supplying the power to the each unit of the slave device, and resets the timer, when the capture signal is not received that the slave device wireless communicator has been initialized.

2. The wireless communication system of claim 1, wherein the master device includes: a master device wireless communicator that performs wireless communication with the slave device; and a master device controller that controls the entire master device, and the master device controller continuously transmits a capture signal to the slave device that waits for reception at a reception timing having a predetermined interval, via the master device wireless communicator for time longer than the predetermined interval.

3. A wireless communication method in a wireless communication system comprising a slave device, and a master device wirelessly connected to the slave device, wherein the slave device is configured to perform operations, including: communicating wirelessly with the master device; supplying power to each unit of the slave device; detecting one or more interrupts; and controlling the entire slave device, wherein the detecting includes supplying power to each unit of the slave device when detecting a timer interrupt occurring at predetermined intervals, and wherein the controlling includes performing an initialization process with regard to the communicating and not performing an entire initialization of each unit of the slave device when the power is supplied to each unit of the slave device, and (1) performing the entire initialization process of each unit of the slave device, when a capture signal is received that the communicating has been initialized, and (2) not performing the entire initialization process of the slave device, stops supplying the power to the each unit of the slave device, and resets the timer, when the capture signal is not received that the slave device wireless communicator has been initialized.

4. The wireless communication system of claim 1, wherein the initialization process of the slave device wireless communicator comprises a process of setting parameters used when the slave device wireless communicator performs the wireless communication, or starting up a program module for the slave device wireless communicator.

5. The wireless communication system of claim 4, wherein the entire initialization process comprises a process of resetting of a logic circuit, or clearing of at least one memory, or clearing of a counter, or performing a validity check of programs for each unit of the slave device.

* * * * *